United States Patent

Buzzard et al.

[15] 3,689,844

[45] Sept. 5, 1972

[54] DIGITAL FILTER RECEIVER FOR FREQUENCY-SHIFT DATA SIGNALS

[72] Inventors: Clair A. Buzzard, Eatontown; Burton R. Saltzberg, Middletown, both of N.J.

[73] Assignee: Bell Telephone Laboratories Incorporated, Murray Hill, Berkeley Heights, N.J.

[22] Filed: Dec. 11, 1969

[21] Appl. No.: 884,250

[52] U.S. Cl. ....................................325/320, 329/104

[51] Int. Cl. ..............................................H04b 1/16

[58] Field of Search ......325/30, 320; 178/66, 67, 68, 178/88; 308/232, 233; 329/110, 126, 104; 328/136, 109–114; 235/154

[56] References Cited

UNITED STATES PATENTS

| | | | |
|---|---|---|---|
| 3,490,049 | 1/1970 | Choquet et al. | 325/320 X |
| 3,571,712 | 3/1971 | Hellwarth et al. | 325/320 |
| 3,512,087 | 5/1970 | Lewis | 325/320 |
| 3,437,932 | 4/1969 | Malakoff | 325/320 |
| 3,488,600 | 1/1970 | Priebe | 329/104 X |
| 3,514,702 | 5/1970 | Nahay et al. | 325/320 |
| 3,543,172 | 11/1970 | Seppeler | 325/320 X |
| 3,307,112 | 2/1967 | Clark | 329/104 |

*Primary Examiner*—Maynard R. Wilbur
*Assistant Examiner*—Charles D. Miller
*Attorney*—R. J. Guenther and Kenneth B. Hamlin

[57] ABSTRACT

Sampled FSK data signals are converted to multibit numbers and processed by a digital filter receiver which includes a band-pass filter, a dual-resonator discriminator and a low-pass filter. The dc baseband data signal is reconstructed from the receiver output number by a "slicer" which detects the sign of the output numbers. The analog-to-number conversion is simplified by limiting the multibit numbers to be processed to two values, simulating the hard limiting of analog signals. Signal harmonics introduced by the nonlinearities of the analog-to-digital converter are substantially eliminated by fixing the sampling rate to a rate which interleaves, in the frequency spectrum, the filter aliases with the harmonics. The receiver is advantageously arranged to be time-shared by a plurality of channels.

4 Claims, 8 Drawing Figures

INVENTORS
C. A. BUZZARD
B. R. SALTZBERG
BY
ATTORNEY

DIGITAL FILTER RECEIVER FOR FREQUENCY-SHIFT DATA SIGNALS

FIELD OF THE INVENTION

This invention relates to frequency-shift signal receivers and, more particularly, to signal receivers, such as discriminators, which utilize digital filters and are capable of being shared, on a time-division basis, by a plurality of data signal channels.

DESCRIPTION OF THE PRIOR ART

In the data processing and data switching arts the central processor or switcher terminates large numbers of incoming data signaling channels. The data channel, in many instances, will comprise a telephone line and the data signals thereon are represented by frequency-shift signals. Recovery of the dc data baseband signals from the frequency-shift signals is provided by a data set receiver, which generally utilizes filter circuits (such as band-pass, low-pass and resonators).

Since a plurality of channels are terminated, the data set receivers (together with transmitters and control equipment) are sometimes grouped to form an arrangement called a multiple data set. To reduce the size, cost and complexity of the multiple data set, it is advantageous to employ equipment which can be used, in common, by all the data set receivers. One such common equipment, used in the past, is a common power supply supplying the power requirements of all the data sets.

It is an object of this invention to further reduce the size, cost and complexity of the data set.

Perhaps the most significant circuits in the receiver are the filters. With respect to filtering signals, it has been suggested that digital filtering can be employed, on a time-shared basis, to accommodate a plurality of signal sources.

Digital filtering is the computational process wherein sequential numbers which define samples of an analog signal are digitally processed to simulate continous filter functions. The digital filter is, therefore, the digital circuitry which performs the computational process. The output of the digital filter then comprises numbers, in sequence, which represent signal samples of the filtered analog signal. It is obvious that a plurality of signal sources can be processed in this manner by multiplexing, on a time-division basis, the samples of the various signals ( and thus the numbers representing the samples). The digital filter is therefore capable of being shared on a time-shared basis by a plurality of channels.

Accordingly, it is a further object of this invention to process incoming analog signals using digital filtering techniques. Specifically, it is an object to recover dc baseband data signals from frequency-shift signals utilizing digital filters in place of analog filters, an advantage of utilizing the digital filters being that they are capable of being shared, on a time-shared basis, by a plurality of signaling channels.

SUMMARY OF THE INVENTION

In the illustrative embodiment of the present invention, a data set receiver utilizes digital circuitry including digital filters which simulate the analog functions provided by band-pass and low-pass filters and resonators. Specifically, signal samples obtained from a voice frequency channel are converted to multibit numbers which are processed by the digital receiver. Thereafter, the signs of the receiver output numbers are utilized to construct signal samples. The samples are passed to an appropriate output port ( such as an associated data sink or processing machine) to be reconstituted as dc baseband signals. Since digital circuitry is employed, the receiver is capable of being shared on a time-shared basis by a plurality of channels and associated output ports.

Although utilizing digital filtering techniques permits employment of common filter circuitry, some of the circuitry is very complex. One example is the analog-to-digital circuit which converts the signal sample to a digital number to represent the signal level. We have discovered, however, that the multibit number to be processed can be arranged to be analogous to a frequency-shift signal which is subject to hard limiting. Since hard limiting of the frequency-shift signal results in a substantially square-wave having one or the other of two amplitude levels, the analogous multibit numbers correspondingly have one or the other of two values.

It is therefore a feature of this invention to arrange the analog-to-digital converter to limit the output numbers to one or the other of two values. This permits substantial reduction in the size, cost and complexity of the converter.

In accordance with the above-mentioned feature, the analog-to-digital converter includes a word number generator for generating a number having one value when a signal sample indicates that the analog signal amplitude is above a midpoint level and for generating a number having another value when the signal sample indicates that the analog signal amplitude is below a midpoint level. The signal sampling is preceded by an analog-to-bit converter ( connected to each incoming telephone line) for producing a square-wave signal having transitions occurring substantially concurrently with the midpoint level crossings of the frequency-shift signal and therefore analogous to hard limiting the signal. The word generator then produces multibit numbers of one or the other values in accordance with the level of the square-wave signal.

A further reduction in cost, size and complexity is accomplished by limiting the output number values of the word number generator to two numbers equal in magnitude and opposite in sign. More specifically, the generator repetitively generates identical groups of bits to form numbers of identical magnitude and generates sign bits to correspond to the incoming signal level. The sign bit is inserted into its appropriate position in the bit group to form positive and negative numbers having equal magnitude.

It is also known that the response of digital filters includes second-order, third-order, etc. responses, sometimes called filter aliases. The nonlinearity of analog-to-digital converters in providing hard limiting introduces signal harmonics which may fall within these filter alias passbands. We have also discovered, however, that consideration of the sampling frequency should be considered with other system parameters and the sampling ( clock) rate be fixed to a rate which interleaves, in the frequency spectrum, the digital filter aliases with the signal harmonics.

The foregoing and other objects and features of this invention will be more fully understood from the following description of an illustrative embodiment thereof taken in conjunction with the accompanying drawings.

DETAILED DESCRIPTION

Figure 1:
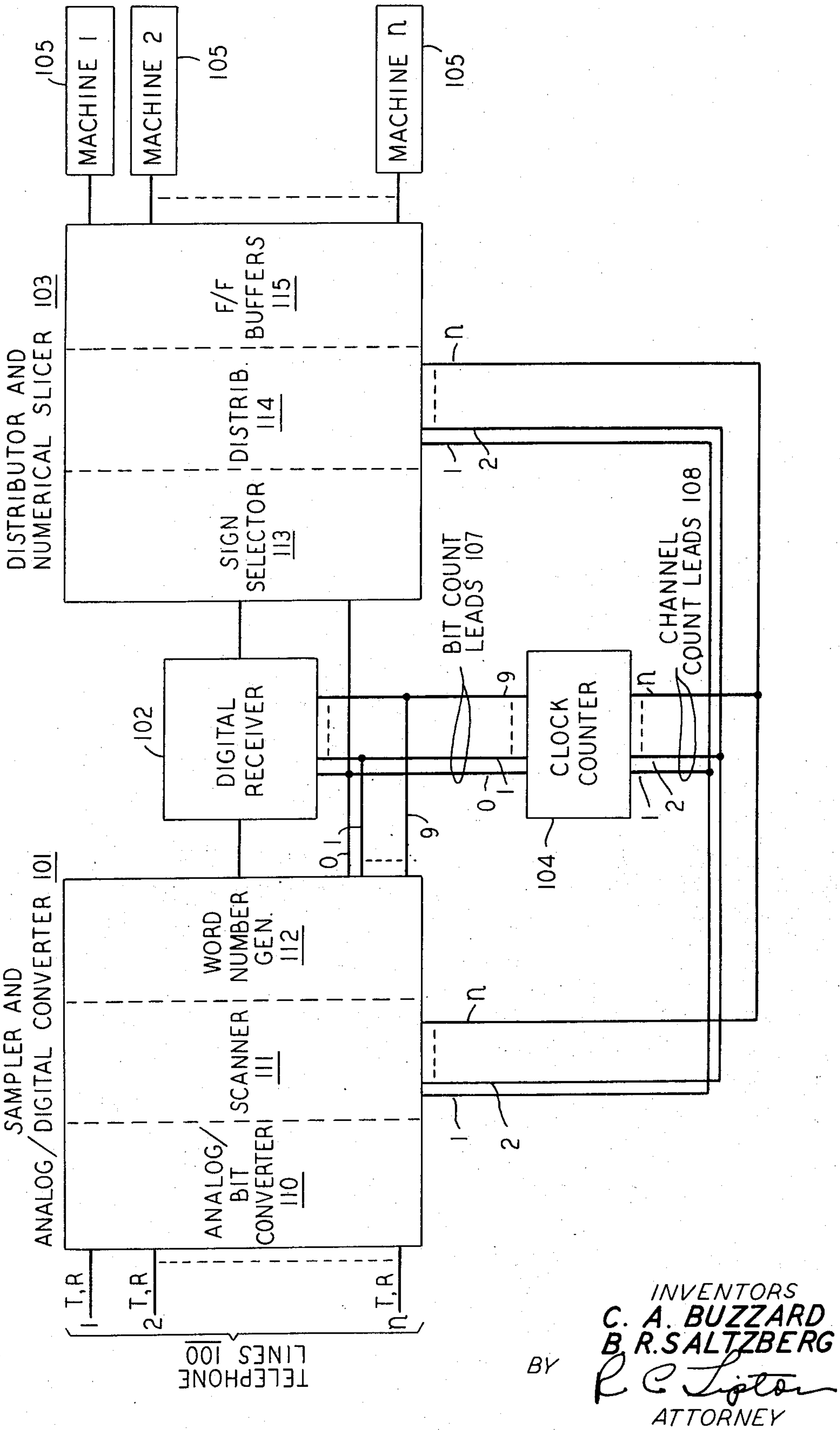
FIG. 1 discloses in block form the various equipment and the manner they cooperate to form a multiple data set receiver in accordance with this invention.

The digital receiver is advantageously embodied in converter, system which may be described as a multiple data set receiver which interconnects a plurality of incoming telephone lines carrying FSK data signals and a corresponding plurality of data sinks or data processing machines capable of receiving baseband binary data signals. Specifically, the incoming frequency-shift signal on each of the plurality of telephone lines is demodulated and the dc baseband data signals derived therefrom are applied to an associated data processing machine. In general, these functions are provided by a sampler and an analog-to-digital converter identified in FIG. 1 by block 101, digital receiver 102, distributor and numerical slicer 103, and, finally, clock counter 104, which maintains the system synchronized.

Sampler and analog-to-digital converter 101 terminates a plurality of telephone lines identified, as a group, as lines 100. In the drawing there are shown *n* lines, each symbolically representing the tip and ring of a telephone line and identified by a number from 1 to *n*. Distributor and numerical slicer 103 includes a plurality of outputs which extend to processing machines identified, as a group, as machines 105. In the drawing there are disclosed *n* machines, each identified by a number 1 to *n* and showing the association between any one of machines 105 and a correspondingly numbered one of telephone lines 100.

Considering first sampler and analog-to-digital converter 101, this circuit comprises three sub-systems which provide the functions of 1. monitoring the incoming frequency-shift signals on each of telephone lines 100 and developing for each line a single bit signal corresponding to the polarity of the FSK signal;
2. scanning the single bits developed thereby, under control of clock counter 104, and producing successive trains of bits, each train comprising a sequence of bits conforming, in sequence, to the numerical sequence of lines 100 and corresponding to the single bit signals developed in response to the FSK signals; and
3. developing a multiple bit number during each time slot or interval allocated to each of the scanned bits in the train, which number has a value which is controlled by the single bit and which defines the polarity of the FSK signal.

The output of sampler and analog-to-digital converter 101 therefore comprises a sequence of multiple bit numbers in a train, each number being a series of bits defining the number corresponding to an incoming telephone line and having a value designating the instantaneous polarity of the frequency-shift signal on the line.

The train of multiple bit numbers is supplied to digital receiver 102. The function of digital receiver 102 is to receive each serial bit number and process the number by use of digital filter techniques to thereby derive output numbers which designate the baseband data signal derived from each frequency-shift signal. Specifically, as described in detail hereinafter, the output number is positive when the input frequency of the frequency-shift signal is above the carrier midband frequency (which, for example, might indicate an incoming mark signal) and the output number is negative when the frequency of the incoming frequency-shift signal is below the midband carrier frequency ( designating an incoming space signal).

Distributor and numerical slicer 103 accepts the output numbers from the digital receiver and, under control of the clock counter, provides three functions; namely:

1. slices the signal by determining whether the signal is positive or negative;
2. distributes the sliced signal to a plurality of flip-flop buffers associated with each of machines 105; and
3. stores the signal in the flip-flop buffers to provide to a plurality of outputs on leads extending to machines 105 the specific mark or space data signal.

The clock counter, as previously described, produces the bit count for the multibit number ( which is in this case a ten-bit number) and produces the channel count for the sequential sampling of the channels and the distribution of the sliced signals. The clock counter generally includes a clock source, such as an oscillator identified by block 401 in FIG. 4, bit ring 402 and channel ring 403. The output of oscillator 401 is applied to and drives bit ring 402. Bit ring 402 advantageously comprises a 10-stage ring counter, each stage providing an output to one of ten leads shown as bit-count leads 107. Accordingly, starting with lead "0" of bit-count leads 107, the leads are sequentially pulsed or enabled to define the time slots dedicated to the serial bits in the multibit number.

The output of bit ring 402, that is, the output derived when final bit lead 9 of bit-count leads 107 is pulsed, is passed to channel ring 403. Channel ring 403 advantageously also comprises a multi-stage ring counter, the number of stages corresponding to the number of incoming telephone lines or channels and the corresponding number of machines to be served. Each stage provides an output to one of $n$ leads shown as channel-count leads 108. Accordingly, the $n$ leads of channel-count leads 108 are sequentially pulsed or enabled, each sequential pulse interval comprising a complete cycling of bit ring 402; that is, for the interval that all of the leads of bit-count leads 107 are sequentially pulsed.

The sequential pulses on channel-count leads 108 are utilized for scanning the single bits derived from telephone lines 100. The sequential pulses and therefore the rate at which channel ring 403 is driven defines the scanning or sampling frequency. The lower limit of the sampling frequency is controlled by the frequency of the FSK signals of the telephone lines. In the specific embodiment shown, the FSK signal marking frequency is 1,270 Hz and the spacing frequency is 1,070 Hz. At least two samples must be obtained for each cycle of the highest significant signal frequency component and this generally fixes the lower limit of the scanning frequency. A second consideration, however, relates to distortion introduced by sampler and analog-to-digital converter 101, which consideration, as discussed hereinafter, tends to determine a higher scanning frequency. In any event, the frequency of oscillator 401 is arranged to drive bit ring 402 at a rate which drives, in turn, channel ring 403 at a rate which defines the predetermined sampling frequency.

Figure 2:
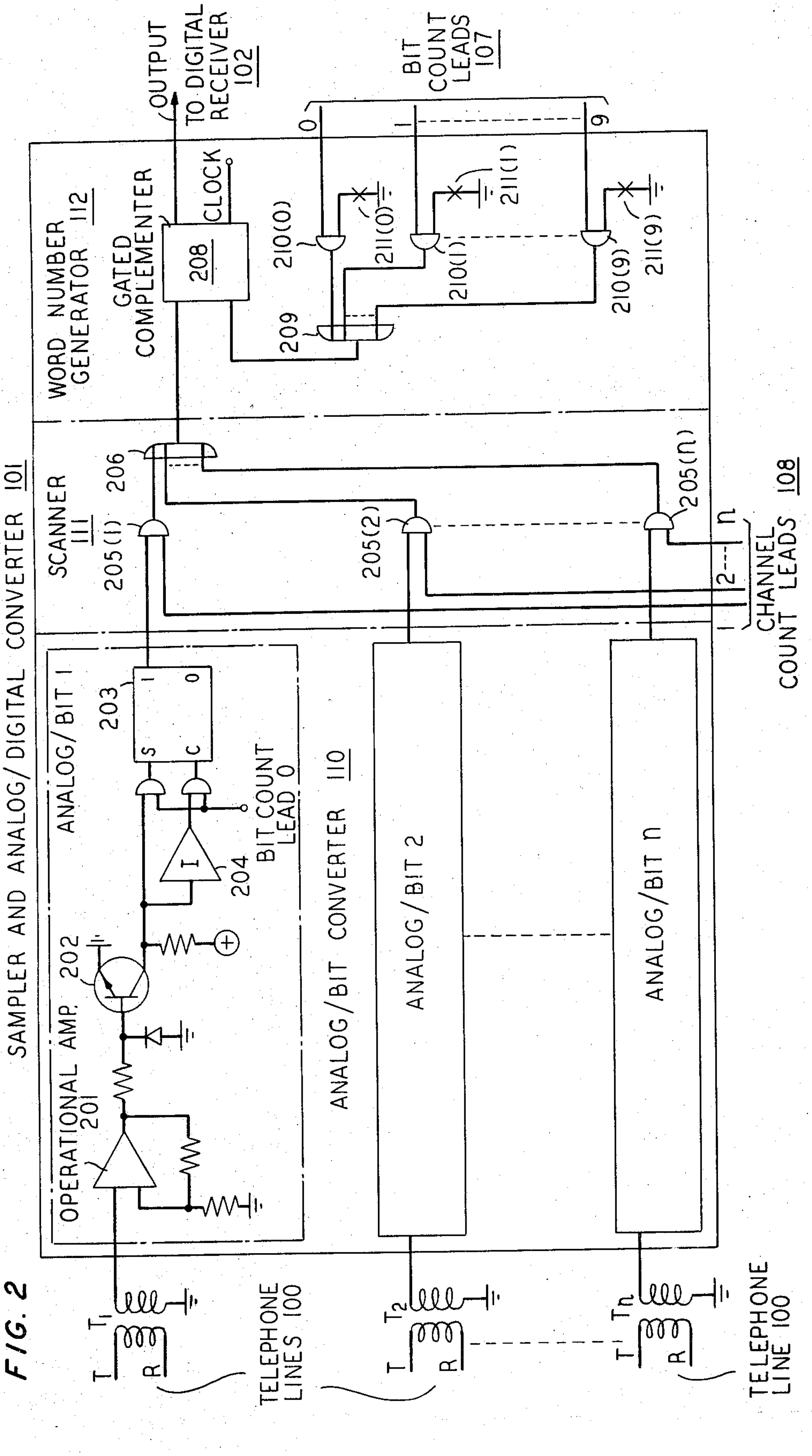
FIG. 2 shows in schematic form the details of the sampler and analog-to-digital converter.

Turning now to sampler and analog-to-digital converter 101, it is recalled that each incoming telephone line terminates therein and the incoming frequency-shift signals are converted to single-bit signals, time multiplexed and applied to a word number generator. As seen in FIG. 2, the tip and ring of each incoming line, such as line 1 of telephone lines 100, are connected across the primary of a transformer, such as transformer T1. The transformer secondary is, in turn, connected to analog-to-bit converter 110 in sampler and analog-to-digital converter 101. More specifically, the secondary of transformer T1 extends to analog-to-bit circuit 1 of analog-to-bit converter 110 and the secondary of each of the other transformers extends to an analog-to-bit circuit dedicated to the individual telephone line.

Each analog-to-bit circuit is arranged in substantially the same manner. With respect to analog-to-bit circuit 1, the secondary of transformer T1 extends therein to an input of operational amplifier 201. Operational amplifier 201 has its other input connected to ground and the output is, therefore, driven positive or negative, depending upon the relationship of the incoming frequency-shift signal with ground. This output signal drives grounded emitter transistor stage 202, which turns ON when the input applied to its base is positive with respect to ground and turns OFF when the input applied to its base is negative with respect to ground.

The collector of the transistor stage 202 is directly coupled to a gate input of the SET input of flip-flop 203 and is connected by way of inverter 204 to a gate input of the CLEAR input of the flip-flop. Gating is provided by lead 0 of bit-count leads 107, whereby the input gates are enabled by a clock pulse at the leading portion of each scanning channel count interval. Accordingly, when transistor stage 202 is OFF and a bit clock pulse occurs, flip-flop 203 is set and, alternatively, when transistor stage 202 is ON and a bit clock pulse occurs, flip-flop 203 is cleared. It is noted that each action occurs at the initiation of the sampling interval.

The output of flip-flop 203 therefore comprises a square-wave signal having crossings occurring nearly concurrently with the FSK signal crossings and corresponding in level to the polarity of the incoming frequency-shift signal. The square-wave signal is therefore analogous to a frequency-shift signal which has been hard limited. This introduces nonlinear distortions to the signal, in the form of harmonics, which present severe difficulties in digital filtering. The manner in which the difficulties are overcome is described hereinafter. This square-wave signal is then passed to scanner portion 111 of sampler and analog-to-digital converter 101.

Scanner 111 generally comprises gates 205(1) to **205(*n*), a gate dedicated to each of telephone lines 100, and common OR gate 206. One input to each gate comprises the square-wave signal of the corresponding analog-to-bit circuit. The other input to each of gates 205(1) to 205(*n*) extends to the lead of channel-count leads 108 which identifies the particular line or channel corresponding to the gate. As previously described, channel-count leads 108 are sequentially enabled. The enabling of lead 1 of channel-count leads 108 enables, in turn, gate 205(1) which therefore samples the square-wave signal output of flip-flop 203**.

In a similar manner, the outputs of flip-flops corresponding to flip-flop 203 but dedicated to the other line channels are sampled, in sequence, by gates 205(2) to **205(*n*) and the sampled outputs are also passed through OR gate 206 to word generator 112. The output of OR gate 206 therefore comprises a train of interleaved bits, each bit aligned in a time slot dedicated to an incoming line or channel and defining the instantaneous polarity of the FSK signal of that particular channel. The pulse train is passed to word generator 112**.

Word generator 112 of of sampler and analog-to-digital converter 101 comprises a plurality of AND gate circuits and an OR gate to generate the bits of a 10-bit data word and a gated complementer for passing the word when a positive number is desired and taking its two's-complement when a negative number is desired.

The ten leads of bit-count leads 107 extend to AND gates 210(0) to 210(9) and sequentially enable the AND gates during each sampling interval. The AND gates, in turn, produce a "1" bit or a "0" bit, depending upon whether or not the other input lead extends to ground by way of manual switches 211(0) to 211(9). This bit is then passed to OR gate 209, whereby a 10-bit number or word is repetitively generated and each bit of the 10-bit word is serially generated. These serial bit numbers are then applied to gated complementer 208.

The inputs to gated complementer 208 comprise the serial bit word output of OR gate 209, the sample bit train from OR gate 206 and a source of clock pulses ( not shown) derived from bit-count leads 107 to provide gating for each bit in the multibit words and resetting of circuitry upon the conclusion of the serial word. Gated complementer 208 includes a conventional gate circuit ( not shown) controlled by the bits from OR gate 206 which either passes the multibit word number to the circuit output or passes the word number to a two's-complementer circuit. If the sample bit from OR gate 206 is positive ( the FSK signal polarity is positive), the serial word number is passed unchanged to the output of gated complementer 208, whereas if the sample bit is negative, the serial word number is passed to the two's-complementer and the output of gated complementer 208 is the two's-complement of the multibit word. The arrangement of the two's-complementer is advantageously of the type described in *IEEE Transactions on Audio and Electroacoustics,* Vol. AU–16, No. 3, "An Approach to the Implementation of Digital Filters" by L. B. Jackson, J. F. Kaiser and H. S. McDonald, page 413.

Accordingly, the output of gated complementer 208 is a sequence of 10-bit numbers of invariable magnitude and positive or negative in sign, depending upon the polarity of the incoming frequency-shift signals. This output is fed to the input of digital receiver 102.

Figure 3A:
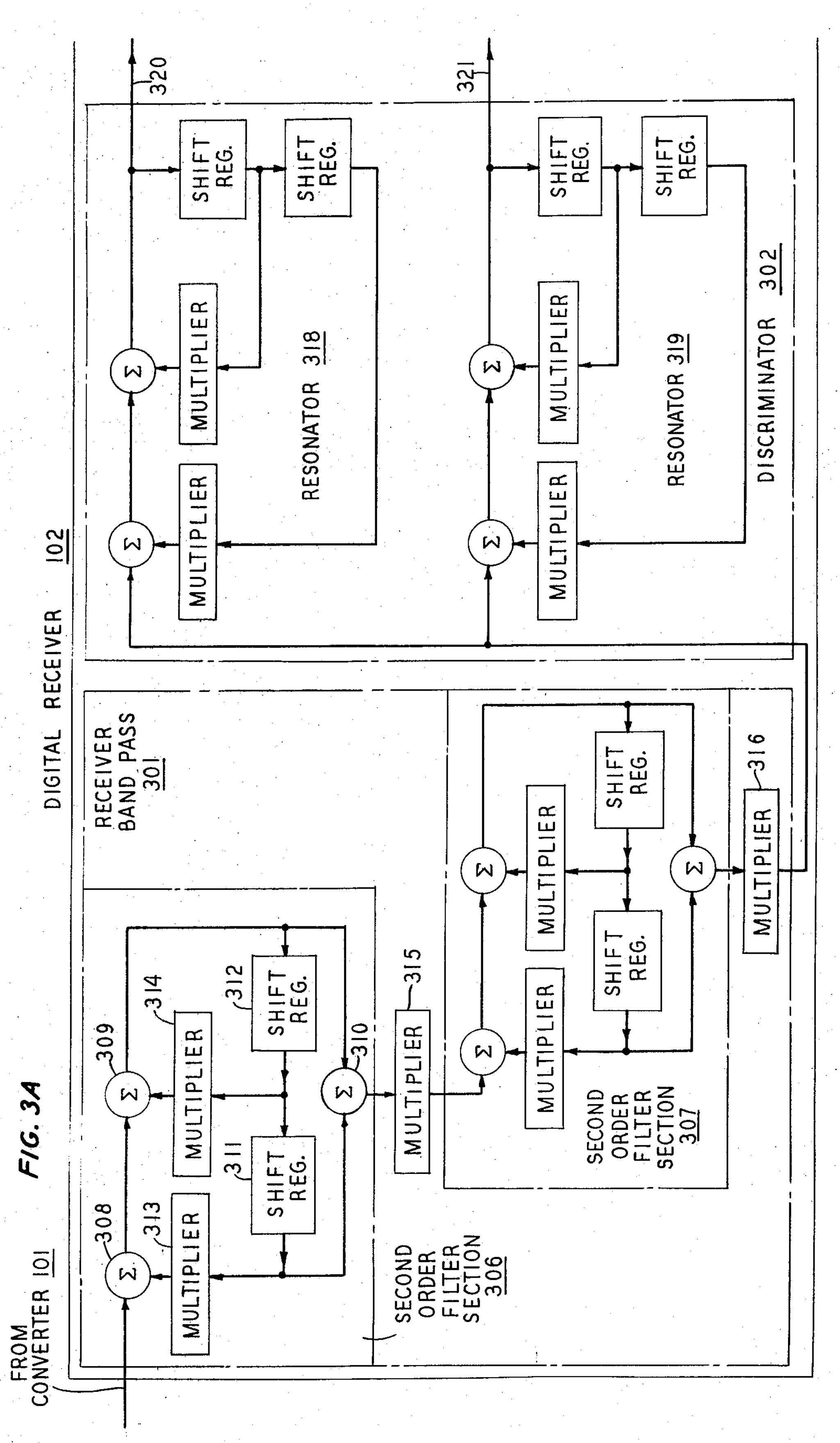
FIGS. 3A and 3B, when arranged side by side, show in schematic form the details of circuits such as the digital filters and the discriminator and the manner in which they are arranged to form a common digital receiver.
Figures 3B, 4:
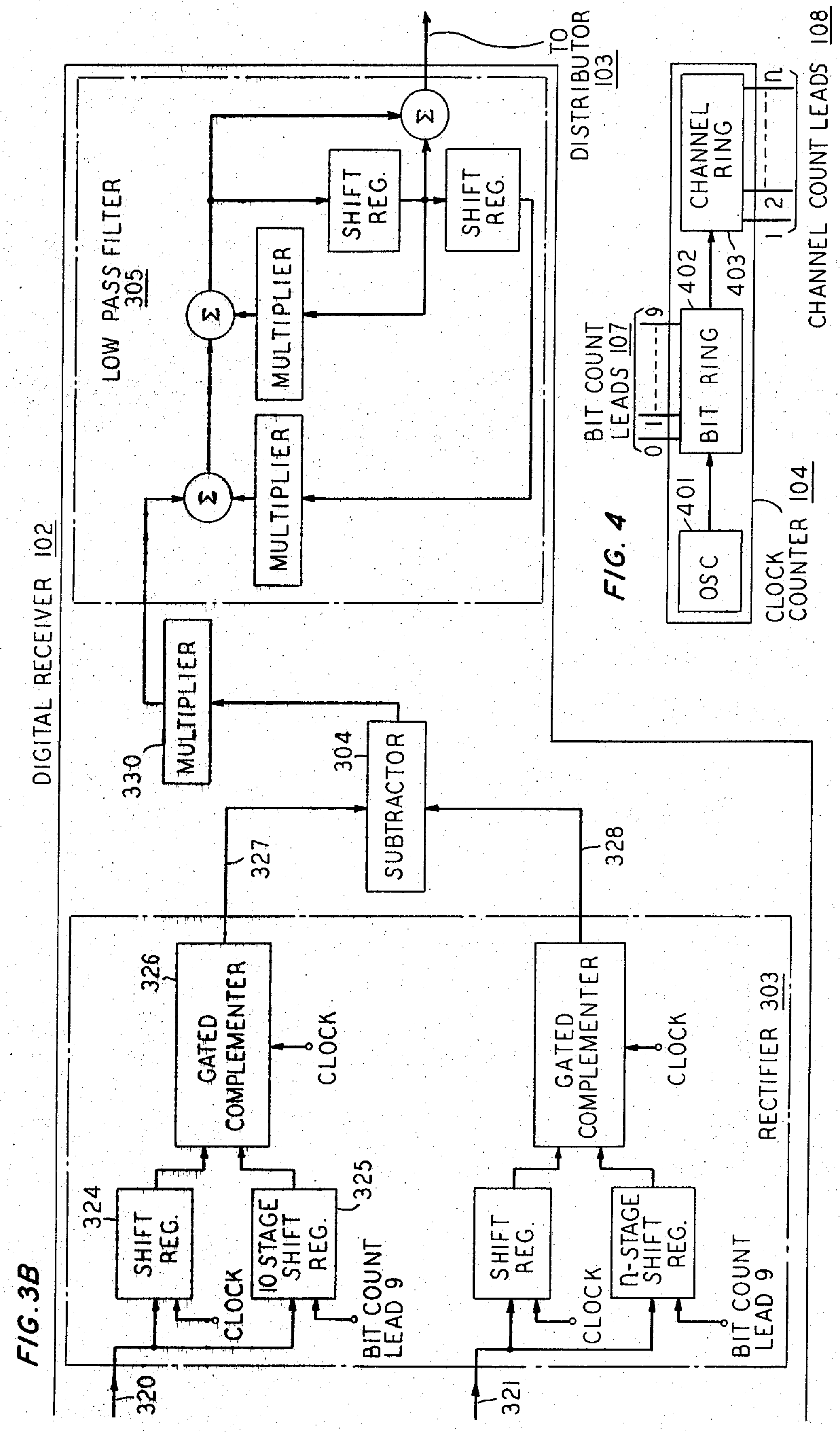
FIG. 4 shows in schematic form a suitable arrangement for a common clock circuit.

The signals fed to the input of digital receiver 102 are directly applied therein to receiver band-pass filter 301, FIG. 3A. Receiver band-pass filter 301 is advantageously a fourth-order Butterworth band-pass filter with the passband extending from 1,020 Hz to 1,320 Hz. The output of band-pass filter 301 is passed to discriminator 302, which includes two resonators, one of which is tuned to 1,020 Hz and the other to 1,320 Hz. The outputs of discriminator 302 are full wave rectified ( in a numerical sense) by rectifier 303, FIG. 3B, and the two rectified outputs thus obtained are subtracted one from the other by subtractor 304. The output of subtractor 304 is fed to low-pass filter 305, which has a cut-off frequency of 300 Hz. The numbers emerging from the low-pass filter represent the amplitude values of the recovered baseband signals and, as described hereinafter, distributor and numerical slicer 103 uses the sign of these numbers to develop the baseband data signal.

Receive band-pass filter 301 comprises cascaded second-order sections 306 and 307. Each of the second-order sections is arranged in substantially the same manner. Sections 306, for example, includes adder circuits 308, 309 and 310, unit delay circuits 311 and 312, and feedback multiplier circuits 313 and 314.

It is to be understood that, unless indicated otherwise, the various circuits in the digital receiver constitute digital circuits and the inputs thereof are clocked in by a clock source, not shown, but derived from bit-count leads 107. Specifically, the bit-count leads are advantageously "ORed" together to provide a clock pulse source having a rate determined by the pulses on all the bit-count leads. Each bit of each serial word number is therefore serially applied to the several circuits which thus serially process the various numbers on a time-shared basis.

A multiplier circuit, suitable for use in the present arrangement, is described in the aforementioned article of L. B. Jackson et al. The multiplication constant of each of the multiplier circuits is determined by the denominator coefficients of the filter which are calculated by producing the partial fraction expansion usable for parallel form filters. The numerators are realized without additional multipliers since, in this case, the coefficients are either "1" or "0." The unit delay circuits are implemented by shift register circuits having a sufficient number of stages to store the 10-bit words of all of the channels ( that is, 10*n* stages). The output of second-order section 306 is then scaled by multiplier 315 before being fed to second-order section 307. This scaling is used throughout the system in order to control the amplitude of the output in view of the gain of the filter sections.

Figure 6A:
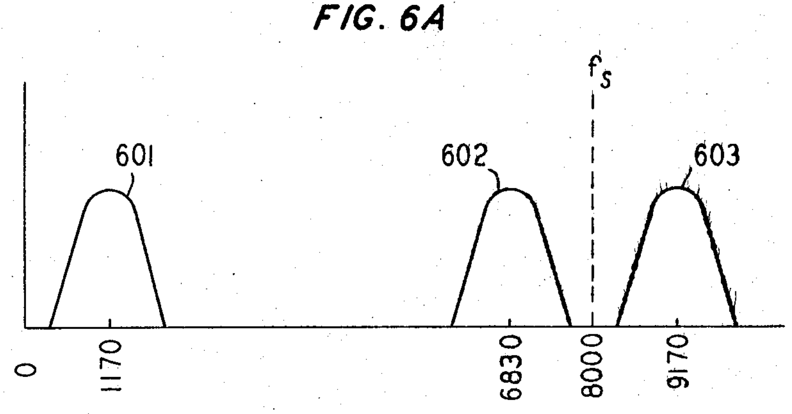
FIGS. 6A and 6B disclose waveforms illustrating, respectively, the passbands defined by the filter aliases and the signal harmonics produced by the analog-to-digital converter.
Figure 6B:
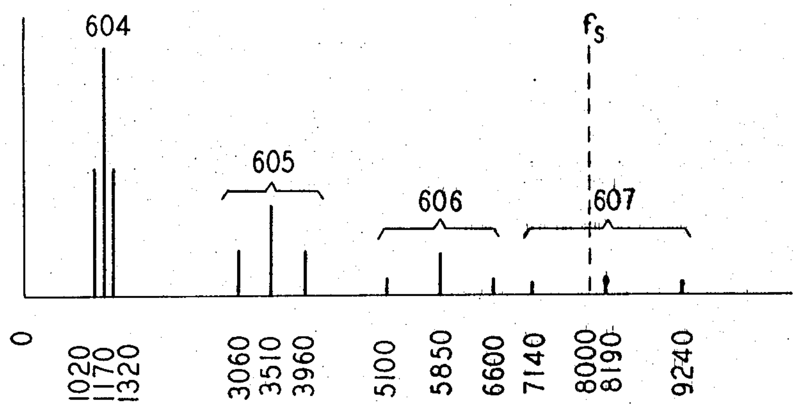

FIG. 6A shows the response of receive band-pass filter 301 and includes a first-order response 601 and a second-order response 602. Second-order response 602 is the same as first-order response 601 mirrored in the sampling frequency which has been selected as 8,000 Hz. The pattern is thereafter repeated for each 8,000 Hz interval. There is also shown the spectrum of a 300 bit-per-second dotting signal using the 1,070 Hz and 1,270 Hz frequency assignments and including the first, third, fifth and seventh harmonics. Significant representations thereof are generally shown, in FIG. 6B, as spectrum lines 604, 605, 606 and 607. These harmonics are prevalent due to the limiting provided by the analog-to-digital converters. Care therefore must be exercised to guard against the unwanted effects of these nonlinearities. It is seen that no major harmonic lines fall in the receive filter passbands. This is accomplished by interleaving the filter responses and the signal harmonics. The primary parameter effective to permit such interleaving is the sampling frequency. Specifically, in choosing the system parameters to be considered, consideration of the sampling frequency is included and the specific sampling frequency is chosen together with the filter coefficients in such a way that the filter aliases and the signal harmonics are interleaved to minimize the effect of the nonlinearities introduced by the analog-to-digital converters.

The output signals of second-order filter section 307 are scaled by multiplier 316 and then fed to discriminator 302. Specifically, the signals are fed in parallel to each of the two resonators 318 and 319, which are zeroless second-order sections. Each resonator includes a pair of adders, two unit delay shift register circuits and two feedback multipliers whose multiplication constants are determined by the filter coefficients, as previously described with respect to the filter sections in receiver band-pass filter 301. Resonator 318 is tuned to 1,320 Hz and resonator 319 is tuned to 1,020 Hz. The outputs of the resonators are then fed, by way of leads 320 and 321, to rectifier circuit 303.

The full wave rectification process in two's-complement arithmetic requires that the input word remains unchanged if the sign bit is positive but is complemented if the sign is negative. The least significant bit of a data word comes first in a serial system and the sign bit comes last. To provide rectification the data word is fed to a unit delay circuit, such as shift register 324, and therefore becomes available at the output thereof during the next sampling cycle. The sign bit of the word is concurrently fed to a parallel delay unit, such as shift register 325, and clocked into the register by bit-count lead 9 which, as previously described, provides the sampling pulse for the last bit in the word.

Shift register 325 contains *n* stages ( corresponding to *n* telephone channels) and the sign bit is therefore available at the output of shift register 325 during the next scanning cycle and concurrent with the availability of the multibit data word at the output of shift register 324. The data word is therefore fed to gated complementer 326 simultaneously with the application thereto of the sign bit. The output of gated complementer 326 on lead 327 therefore comprises a full wave rectification of the data words on lead 320. Similarly, the data words on lead 321 are rectified and the full wave rectified signals are passed to lead 328. The two rectified signals on leads 327 and 328 are then applied to subtractor 304, which advantageously is of the type described in the L. B. Jackson et al. article referred to hereinbefore.

The subtractor output is fed to low-pass filter 305 which has the configuration of a second-order Butterworth filter and a cut-off frequency of 300 Hz. The input to the filter is first passed, however, through multiplier 330 which scales the signal to reflect the gain of the low-pass filter. The filter hardware includes adder circuits, unit delay circuits and multipliers, all of the configuration being similar to the configuration used in the other digital filter sections. The output of low-pass filter 305 then constitutes the baseband signals which are passed on to distributor and numerical slicer 103.

Figure 5:
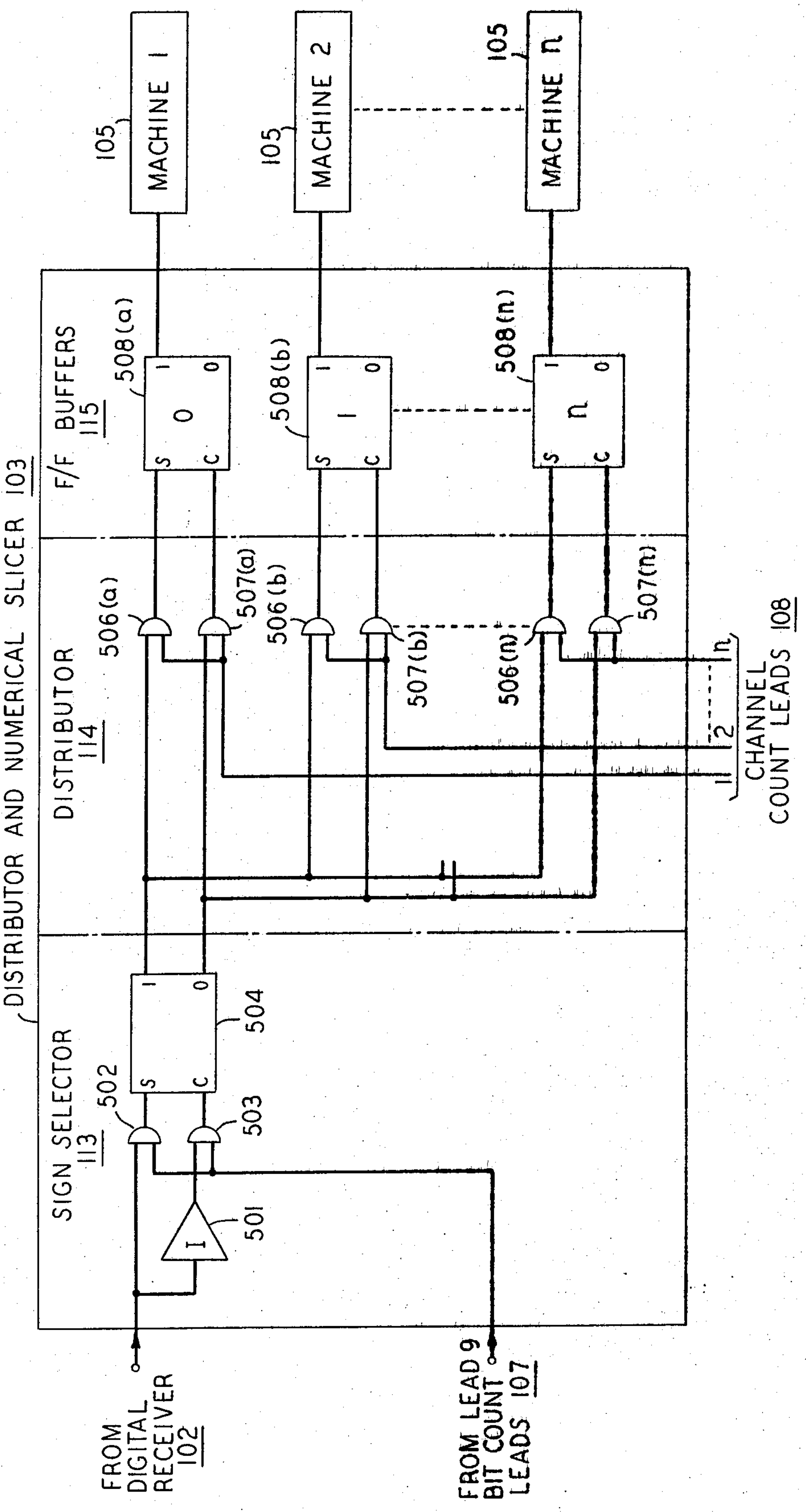
FIG. 5 discloses in schematic form an output numerical slicer and distributor circuit utilized in the specific embodiment disclosed herein for distributing the receiver outputs to the various output ports.

The serial data words from digital receiver 102 are passed to sign selector circuit 113 of distributor and numerical slicer 103, as previously described. Specifically, as seen in FIG. 5, the digital word is directly applied to a first gate 502 in sign selector circuit 113 and is applied by way of inverter 501 to a second gate 503. The function of the gates is to sample the sign bit and pass the sample to flip-flop 504. The other input leads to gates 502 and 503 are coupled together and then to lead 9 in bit-count leads 107. Lead 9 defines the slot allocated to the sign bit. Consequently, when an incoming data word is positive, the sign bit constitutes a "1" bit and this bit is gated through gate 502 to set flip-flop 504. A "0" sign bit, of course, is inverted and gated through gate 503 to clear flip-flop 504. The flip-flop is thus set by a "positive" sign bit and remains set until a negative sign bit from the output of digital receiver 102 clears the flip-flop. Flip-flop 504 then remains clear until a positive sign bit is provided by digital receiver 102. The output of flip-flop 504 is then passed, double rail, to distributor 114.

Distributor 114 comprises a plurality of pairs of AND gates wherein individual ones of gates 506($a$) to 506($n$) are paired with gates 507($a$) to 507($n$) and each pair is dedicated to a channel. In accordance therewith, each of channel-count leads 108 extends to a corresponding pair of gates whereby each pair of gates is enabled concurrently with the scanning of the corresponding channel. The "1" output of flip-flop 504 is connected to one gate of every pair, such as gate 506($a$), while the "0" output is connected to the other gate of every pair, such as gate 506($b$). Since flip-flop 504 is storing the sign bit of the word of the channel concurrently being sampled, the enabling of the pair of gates dedicated to the channel passes the sign bit of the channel word through the gate pair to buffer flip-flop 115. Specifically, when a "positive" sign bit is stored in flip-flop 504 and the gate pair comprising gates 506($a$) and 506($b$) is enabled, a "1" bit is gated through gate 506($a$) to set buffer flip-flop 508($a$), which flip-flop corresponds to the same channel as the gate pair. Alternatively, if a negative sign bit is stored in flip-flop 504, a bit is gated through gate 507($a$) to clear buffer flip-flop 508($a$). Flip-flop 508($a$), therefore, is maintained in its set or clear condition until a signal polarity transition occurs. The output of flip-flop 508($a$), therefore, comprises a recovered data signal corresponding to the incoming FSK signal. This data signal is then passed on to the corresponding one of machines 105, to be recorded as previously indicated.

Although a specific embodiment of this invention has been shown and described, it will be understood that various modifications may be made without departing from the spirit of this invention.

We claim:

1. A frequency-shift signal receiver including sampling means for producing signal samples defining instantaneous amplitudes of the frequency-shift signal;

generator means for producing multibit digital signals representing numbers which designate amplitude link in response to said signal samples; and a digital filter for processing the multibit digital signals characterized in that the generator means comprises means arranged to gate to the digital filter the digital signal representing one of the numbers in response to the signal samples defining the instantaneous amplitudes above a midpoint level and the digital signal complement of the one number, with respect to a number designating the midpoint level, in response to the signal samples defining the instantaneous amplitudes below the midpoint level, whereby the gated digital signals are limited to the one number value and the complement thereof.

2. A frequency-shift receiver in accordance with claim 1 wherein the one number and the complement thereof are equal in magnitude and opposite in sign.

3. A frequency-shift receiver in accordance with claim 2 wherein the generator means further includes means for repetitively generating identical groups of bits to form the digital signal representing the one number and means responsive to the signal samples for producing a sign bit and inserting the sign bit into the group of bits to produce positive and negative numbers.

4. A method of suppressing signal harmonics in a receiver for a frequency-shift signal comprising the steps of, 1. generating a train of clock pulses,
2. converting the input signals by: sampling the frequency-shift signal input using the clock pulses and producing signal bits defining instantaneous amplitudes of the frequency-shift signals, operating on a signal bit to produce multibit digital signals representing numbers,
3. digitally filtering the multibit digital signals using the clock pulses to operate the filter,
4. Selecting a pulse rate for said train which interleaves, in the frequency spectrum, the filtering aliases generated during said filtering step with the signal harmonics introduced by said converting step.

* * * * *